(12) United States Patent
Tanaka et al.

(10) Patent No.: US 8,976,100 B2
(45) Date of Patent: Mar. 10, 2015

(54) LIQUID CRYSTAL DISPLAY HAVING A TRANSITION FROM SPLAY ALIGNMENT TO BEND ALIGNMENT AND DRIVING METHOD THEREOF

(71) Applicants: Yukio Tanaka, Kanazawa (JP); Daiichi Suzuki, Nonoichi (JP); Kenji Nakao, Kanazawa (JP)

(72) Inventors: Yukio Tanaka, Kanazawa (JP); Daiichi Suzuki, Nonoichi (JP); Kenji Nakao, Kanazawa (JP)

(73) Assignee: Japan Display Inc., Tokyo (JP)

( * ) Notice: Subject to any disclaimer, the term of this patent is extended or adjusted under 35 U.S.C. 154(b) by 157 days.

(21) Appl. No.: 13/692,234

(22) Filed: Dec. 3, 2012

(65) Prior Publication Data

US 2013/0141411 A1    Jun. 6, 2013

(30) Foreign Application Priority Data

Dec. 5, 2011 (JP) ................................. 2011-265951

(51) Int. Cl.
*G09G 3/36* (2006.01)
*G02F 1/1333* (2006.01)

(52) U.S. Cl.
CPC ............ *G09G 3/3696* (2013.01); *G02F 1/1333* (2013.01); *G09G 3/3614* (2013.01); *G09G 3/3648* (2013.01); *G09G 3/3655* (2013.01); *G09G 2310/06* (2013.01)
USPC ............................................ 345/96; 345/209

(58) Field of Classification Search
CPC ............ G02F 1/1333; G09G 2310/06; G09G 3/3614; G09G 3/3648; G09G 3/3655; G09G 3/3696

USPC .............................................. 345/94–96, 209
See application file for complete search history.

(56) References Cited

U.S. PATENT DOCUMENTS

| 2006/0274011 | A1* | 12/2006 | Igarashi et al. | ............... 345/94 |
| 2008/0024405 | A1 | 1/2008 | Fukami et al. | |
| 2009/0167972 | A1* | 7/2009 | Hong | ............... 349/37 |
| 2010/0245697 | A1* | 9/2010 | Shiiba et al. | ............... 349/39 |

FOREIGN PATENT DOCUMENTS

| JP | 2002-287113 A | 10/2002 |
| JP | 2007-316387 A | 12/2007 |

(Continued)

OTHER PUBLICATIONS

Office Action issued Feb. 18, 2014 in Japanese Patent Application No. 2011-265951 (with English language translation).
Toshiyuki Higano, et al., "A Full-Resolution and Glasses-Free 3D Display using the OCB-III with a Light Directional Backlight", Proc. IDW'10, LCT5-1, 2010, pp. 597-600.

(Continued)

*Primary Examiner* — Long D Pham
(74) *Attorney, Agent, or Firm* — Oblon, McClelland, Maier & Neustadt, L.L.P.

(57) ABSTRACT

According to one embodiment, a display includes pixel electrodes arranged in a matrix, gate lines extending along rows, signal lines extending along columns, storage capacitance lines extending along the rows to superpose a voltage on the pixel electrodes, a counterelectrode opposed to the pixel electrodes, a driver to drive the gate lines, the signal lines, and the storage capacitance lines, and a controller to control the driver. The controller sequentially drives the gate lines to write from the signal lines to the pixel electrodes and, after the write to the pixel electrodes, changes a potential of each of the storage capacitance lines to cause alignment of the liquid crystal layer to make a transition from splay alignment to bend alignment.

5 Claims, 8 Drawing Sheets

(56) References Cited

FOREIGN PATENT DOCUMENTS

| | | |
|---|---|---|
| JP | 2008-026817 A | 2/2008 |
| JP | 2008-281702 A | 11/2008 |
| JP | 2009-058793 A | 3/2009 |
| JP | 2009-186912 | 8/2009 |

OTHER PUBLICATIONS

Daiichi Suzuki, et al., "31.2: Crosstalk-Free 3D Display with Time-Sequential OCB LCD", SID '09 Digest, 31.2 I, 2009, pp. 428-431.

* cited by examiner

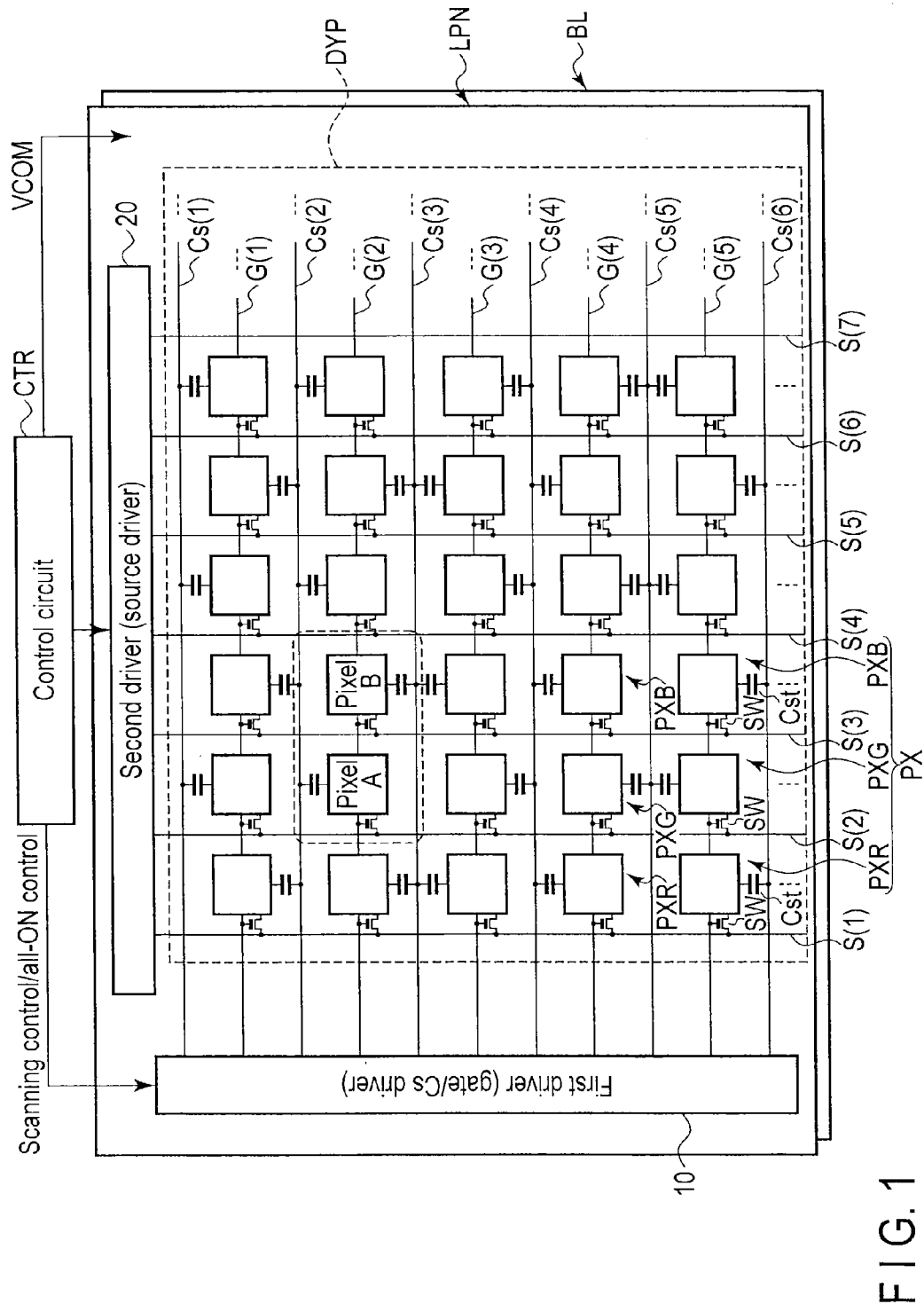
F I G. 1

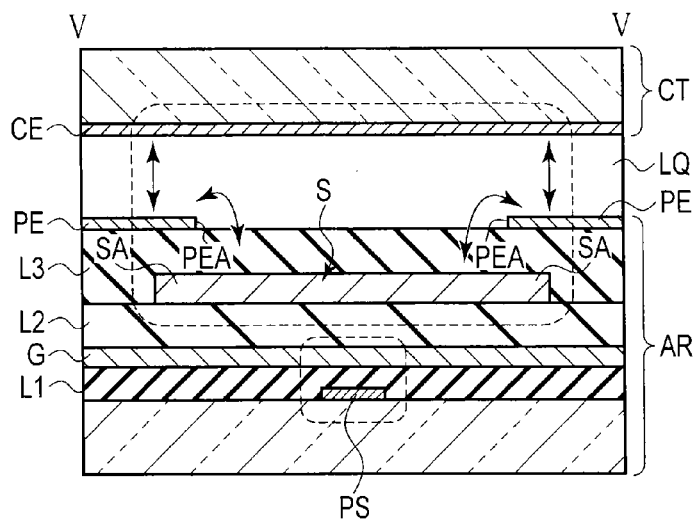
F I G. 5
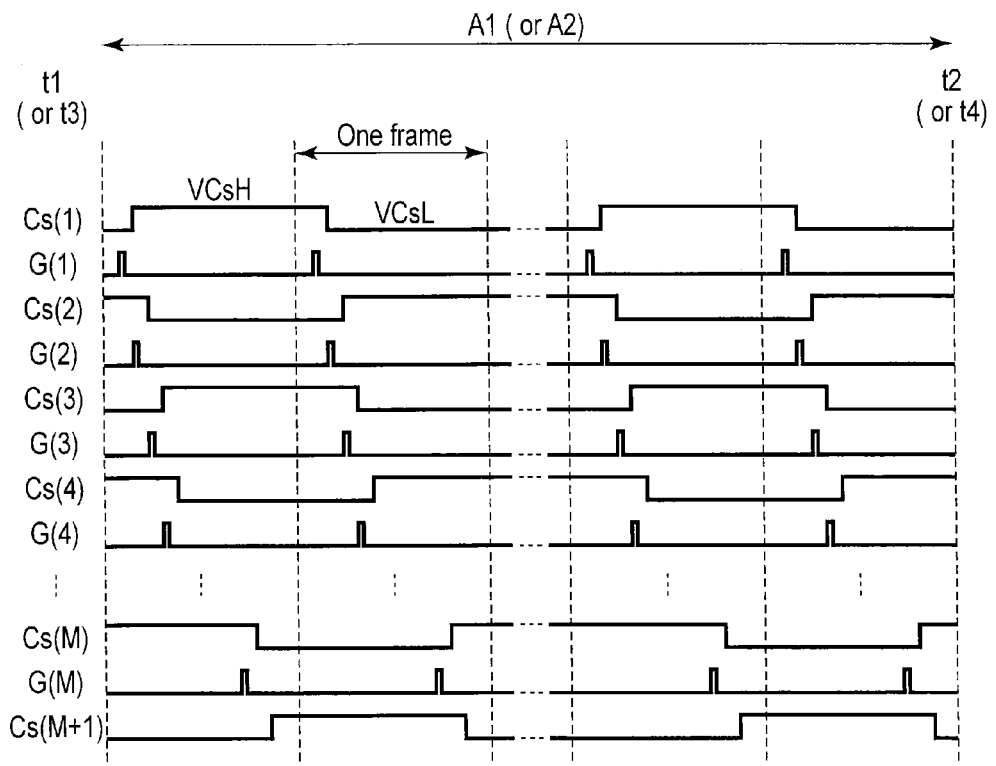
F I G. 7

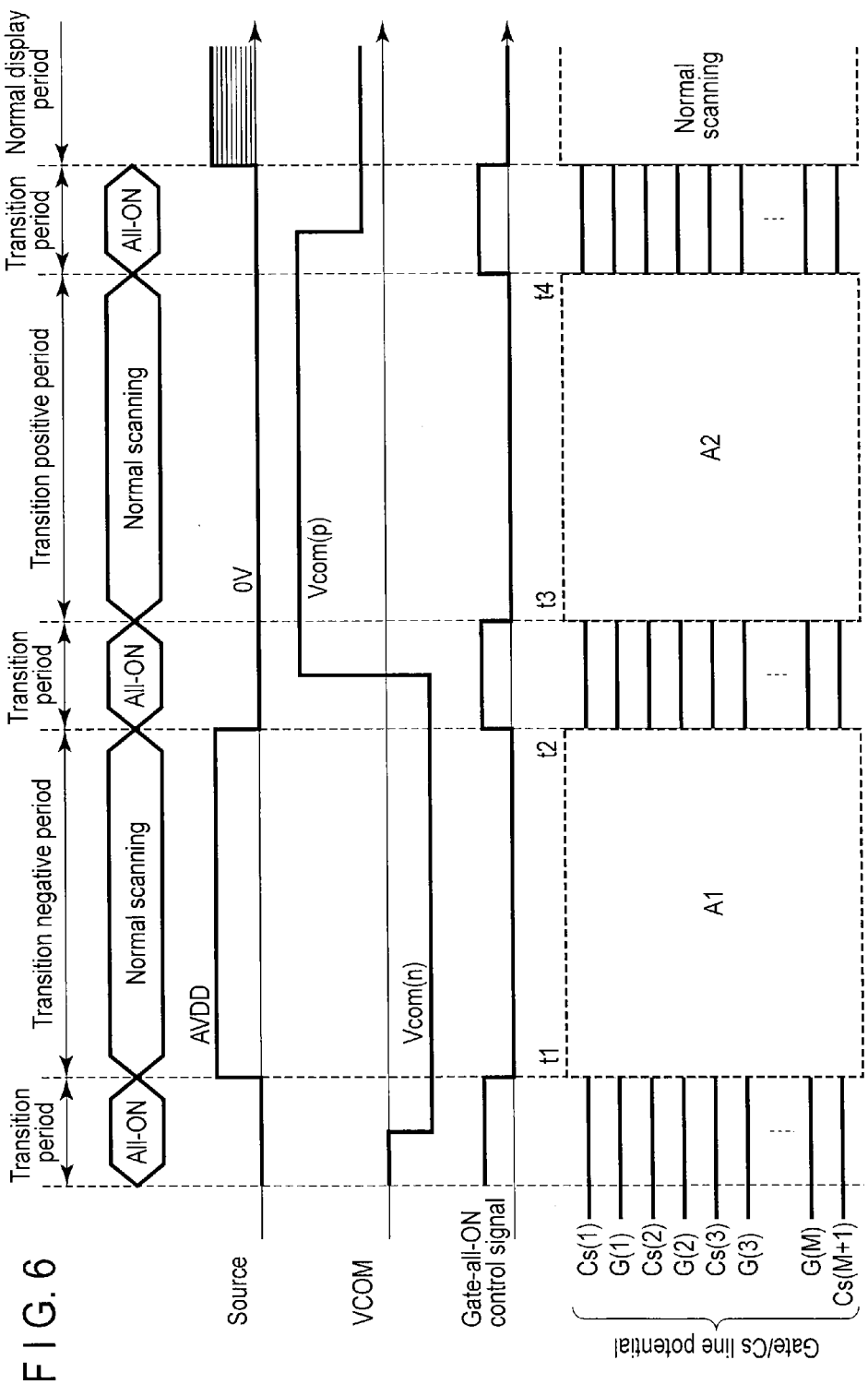
F I G. 6

|  | Part A1 (transition negative period) | Part A2 (transition positive period) |
|---|---|---|
| Signal line potential (Source) | AVDD | 0 |
| Potential to be written to pixel | AVDD | 0 |
| Pixel retention potential after CC superposition | AVDD±ΔVcc | 0±ΔVcc |
| Counterelectrode potential (VCOM) | Vcom(n) | Vcom(p) |
| \|Longitudinal voltage\| | (AVDD±ΔVcc)−Vcom(n) | Vcom(p)−(0±ΔVcc) |
| \|Lateral voltage\| | ΔVcc | ΔVcc |

※ ΔVcc: absolute value of CC superposition voltage   ※ Field-through voltage at gate-OFF time is neglected

F I G. 10

LIQUID CRYSTAL DISPLAY HAVING A TRANSITION FROM SPLAY ALIGNMENT TO BEND ALIGNMENT AND DRIVING METHOD THEREOF

CROSS-REFERENCE TO RELATED APPLICATIONS

This application is based upon and claims the benefit of priority from Japanese Patent Application No. 2011-265951, filed Dec. 5, 2011, the entire contents of which are incorporated herein by reference.

FIELD

Embodiments described herein relate generally to a liquid crystal display and a driving method of the liquid crystal display.

BACKGROUND

An optically compensated bend (OCB) liquid crystal is known by having a characteristic of high-speed response, and receives attention as a liquid crystal mode most suitable for a display of which high-speed response is required, such as a display of a time-division system configured to carry out three-dimensional display.

The OCB liquid crystal is generally in a state of alignment called splay alignment when no-voltage is applied to the liquid crystal layer. However, in order to make the OCB liquid crystal exhibit the above-mentioned high-speed responsivity, it is necessary to operate the OCB liquid crystal in a state of alignment called bend alignment. For that purpose, it is required that a normal display operation be carried out after causing the OCB liquid crystal to make a transition from the splay alignment to the bend alignment within a short time immediately after turning-on of the power to a liquid crystal display. At this time, the drive to be carried out in order to cause the OCB liquid crystal to make a transition from the splay alignment to the bend alignment is called transition drive.

BRIEF DESCRIPTION OF THE DRAWINGS

FIG. 1 is a view schematically showing a configuration example of a liquid crystal display of an embodiment.

FIG. 5 is a view schematically showing an example of a cross section of the liquid crystal display panel taken along line V-V of FIG. 2.

FIG. 6 is a view showing an example of transition drive waveforms in the liquid crystal display of the embodiment.

FIG. 7 is a view showing an example of gate line drive waveforms and storage capacitance line drive waveforms in a transition negative period and transition positive period of FIG. 6.

FIG. 10 is a table showing an example of a signal line potential, potential to be written to a pixel, pixel retention potential after superposition of storage capacitance, counter-electrode potential, absolute value of a longitudinal voltage, and absolute value of a lateral voltage.

DETAILED DESCRIPTION

Figure 2:
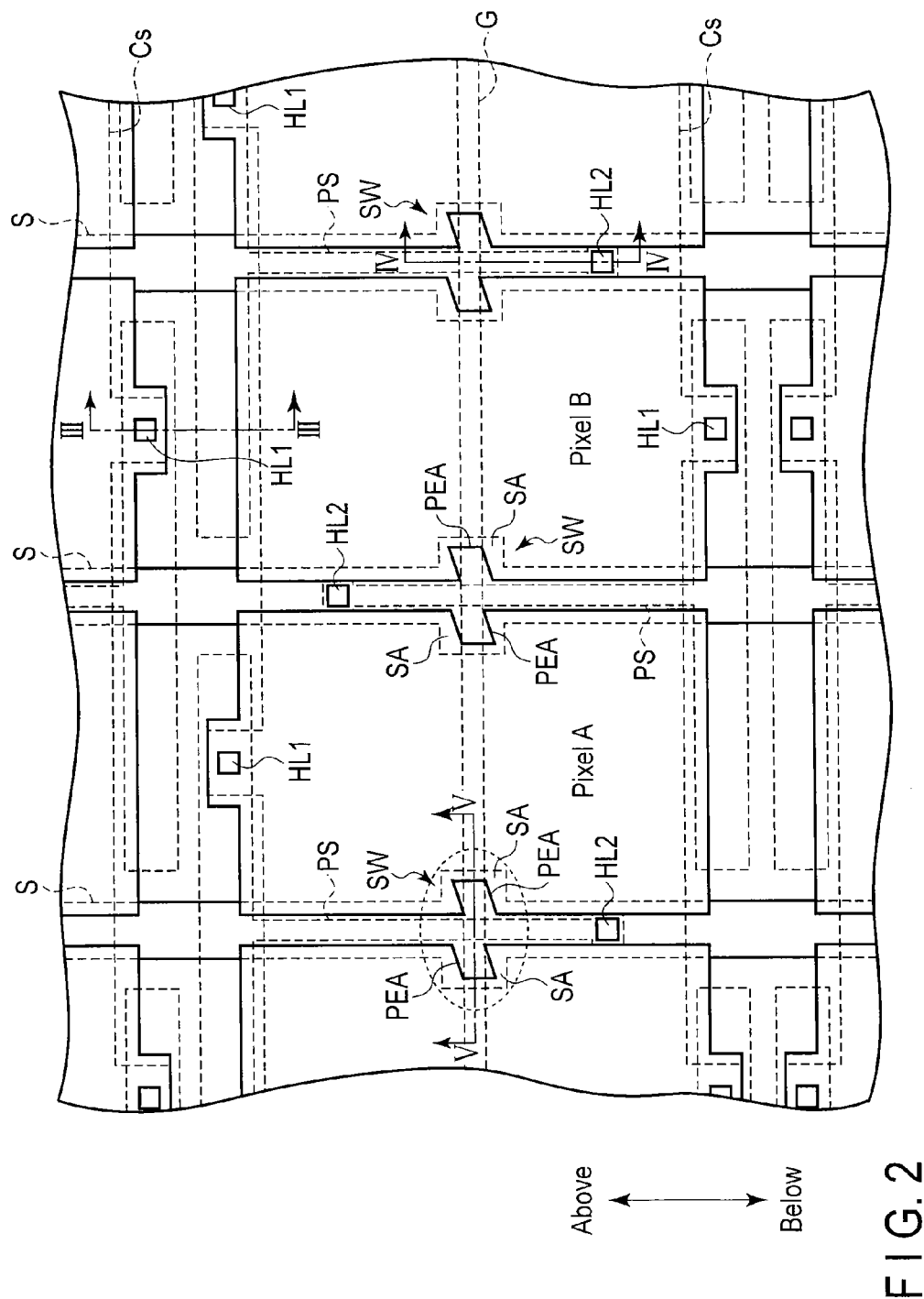
FIG. 2 is a view showing an example of pixel layout of the liquid crystal display of the embodiment.

In general, according to one embodiment, there is provided a liquid crystal display comprises a plurality of pixel electrodes arranged in a matrix; a plurality of gate lines extending along rows in which the display pixel electrodes are arranged; a plurality of signal lines extending along columns in which the display pixel electrodes are arranged; a plurality of storage capacitance lines extending along the rows in which the display pixel electrodes are arranged, and configured to superpose a voltage on the pixel electrodes by capacitive coupling; a plurality of pixel switches configured to switch connection between the signal lines and the corresponding pixel electrodes by a voltage to be applied to the gate lines; a counterelectrode opposed to the plurality of pixel electrodes through a liquid crystal layer; a driver configured to drive the gate lines, the signal lines, and the storage capacitance lines; and a controller configured to control the driver. In a transition drive period configured to cause alignment of the liquid crystal layer before a normal display period to make a transition from splay alignment to bend alignment, the controller sequentially drives the gate lines to write from the signal lines to the pixel electrodes and, after the write from the signal lines to the pixel electrodes, changes a potential of each of the storage capacitance lines to superpose a voltage based on capacitive coupling on each of the pixel electrodes.

Hereinafter, embodiments will be described below with reference to the drawings.

FIG. 1 is a view schematically showing a configuration example of a liquid crystal display of an embodiment. The liquid crystal display according to this embodiment is provided with a liquid crystal display panel LPN including a display section DYP constituted of a plurality of display pixels PX, back light BL arranged to illuminate the display section DYP of the liquid crystal display panel LPN, and controller CTR configured to control the liquid crystal display panel LPN and back light BL.

The liquid crystal display panel LPN includes a pair of substrates, i.e., an array substrate AR (shown in FIGS. 3 to 5) and countersubstrate CT (shown in FIGS. 3 to 5), and liquid crystal layer LQ (shown in FIGS. 3 to 5) held between the array substrate AR and countersubstrate CT.

The liquid crystal display according to this embodiment is a liquid crystal display of a color display type, and the plurality of display pixels PX thereof include a plurality of color display pixels. The liquid crystal display shown in FIG. 1 includes red display pixels PXR configured to display red, green display pixels PXG configured to display green, and blue display pixels PXB configured to display blue. The display pixels of each color are arranged in line substantially in parallel with a direction in which signal lines S extend.

The array substrate AR includes a transparent insulating substrate such as glass. A pixel electrode PE is arranged on the transparent insulating substrate in each display pixel PX. A plurality of pixel electrodes are arranged in a matrix. Furthermore, the array substrate AR includes a plurality of gate lines G (G (1) to G (M)) arranged along rows in which a plurality of pixel electrodes PE are arranged, a plurality of signal lines S (S (1) to S (N)) extending along columns in which a plurality of pixel electrodes PE are arranged among a plurality of pixel electrodes PE, storage capacitance lines Cs (Cs (1) to Cs (M+1)) extending substantially in parallel with the gate lines G, and a plurality of pixel switches SW arranged in the vicinities of intersection positions of the gate lines G and signal lines S.

Each of the pixel switches SW includes a thin-film transistor (TFT) as, for example, a switching element. A gate of a pixel switch SW is electrically connected to a gate line G (or is formed integral with the gate line G). A source of the pixel switch SW is electrically connected to a signal line S (or is formed integral with the signal line S). A drain of the pixel switch SW is electrically connected to a pixel electrode PE (or is formed integral with the pixel electrode PE). That is, a source-drain path of the pixel switch SW is connected between a signal line S and pixel electrode PE. When driven through each corresponding gate line G, each pixel switch SW is brought into conduction between the corresponding signal line S and corresponding pixel electrode PE.

The liquid crystal display panel LPN is provided with a first driver (gate/Cs driver) 10 configured to sequentially drive a plurality of gate lines G (1) to G (M) in order to bring a plurality of pixel switches SW into conduction in units of, for example, rows, and drive also a plurality of storage capacitance lines Cs (1) to Cs (M+1), and second driver (source driver) 20 configured to output a video signal or a non-video signal to each of a plurality of signal lines S (1) to S (N) within a period in which a pixel switch SW of each row is conductive by the drive of a corresponding gate line G. Each of the first driver 10 and second driver 20 is a driver configured to drive the gate lines G, signal lines S or storage capacitance lines Cs.

There is a case where the first driver 10 and second driver 20 are formed into an IC shape of external circuitry, and case where they are incorporated into the array substrate AR on a part thereof as an internal circuit. In the liquid crystal display according to this embodiment, the first driver 10 and second driver 20 are arranged around the display section DYP, and are controlled by the controller CTR.

It should be noted that although in FIG. 1, the first driver 10 is arranged on the left side of the display section DYP when viewed on the page of the drawing, the first driver 10 is arranged on the right side in some cases. Further, in some cases, two first drivers 10 having the same function are arranged symmetrically on both the right side and left side. Furthermore, in some cases, the first driver 10 may be divided into two parts of a function of driving gate lines, and function of driving storage capacitance lines Cs, and one of these two parts is arranged on the right side and another is arranged on the left side of the display section DYP.

The countersubstrate CT includes a color filter (not shown) constituted of pigmented layers of red, green, and blue arranged on the transparent insulating substrate such as glass, and counterelectrode (not shown) or the like arranged on the color filter opposite to a plurality of pixel electrodes PE.

Each of the pixel electrodes PE and the counterelectrode CE are constituted of a transparent electrode material such as ITO, and each of them is covered with a pair of alignment layers subjected to an alignment layer treatment process such as rubbing in directions parallel to each other. Each of the pixel electrodes PE and the counterelectrode CE constitute a display pixel PX in cooperation with a pixel region which is part of a liquid crystal layer LQ controlled to be in liquid crystal molecular arrangement corresponding to electric fields from the pixel electrodes PE and counterelectrode CE.

The plurality of color display pixels are classified according to a color of the pigmented layer arranged in each of them. A red display pixel includes a red pigmented layer. A green display pixel includes a green pigmented layer. A blue display pixel includes a blue pigmented layer.

Each of the plurality of display pixels PX includes liquid crystal capacitance (not shown) constituted of a liquid crystal layer LQ held between a pixel electrode PE and the counterelectrode CE. The liquid crystal capacitance is determined by a relative dielectric constant of the liquid crystal material, pixel electrode area, and liquid crystal cell gap.

A voltage (hereinafter referred to as a source voltage) applied to a signal line S by the second driver 20 is applied to a pixel electrode PE of a display pixel PX of a selected row through a corresponding pixel switch SW. A potential difference between the voltage (pixel potential) applied to the pixel electrode PE, and countervoltage Vcom applied to the counterelectrode CE is held in the liquid crystal capacitance.

Further, storage capacitance Cst is constituted of part of a pixel electrode PE (or a semiconductor layer of a switching element) laminated through insulating films, and each of storage capacitance lines Cs (Cs (1) to Cs (M+1)) arranged to extend substantially in parallel with the gate lines G. Within a hold time after write of a signal to the pixel electrode PE, the storage capacitance Cst is combined with the liquid crystal capacitance.

It should be noted that although there are a case where the storage capacitance Cst is connected to a storage capacitance line Cs positioned on the upper side (one of directions in which the signal line S extends) of the pixel electrode PE, and case where the storage capacitance Cst is connected to a storage capacitance line Cs positioned on the lower side (the other of directions in which the signal line S extends) of the pixel electrode PE, the storage capacitance lines Cs from each of which the storage capacitance Cst is output are appropriately distributed in such a manner that the loads of the storage capacitance lines Cs of the rows are substantially uniform.

In the normal display operation, the controller CTR outputs a control signal generated on the basis of a synchronizing signal input from an external signal source to the first driver 10, and outputs a control signal generated on the basis of a synchronizing signal input from the external signal source, and video signal input from the external signal source or inverse transition preventing signal for black insertion to the second driver 20. Furthermore, the controller CTR outputs a countervoltage Vcom to be applied to the counterelectrode CE of the countersubstrate CT.

Further, also in the transition drive to be carried out prior to display at the time of startup after turning-on of the power, the controller CTR outputs a control signal needed to carry out the transition drive to the first driver 10, and outputs a voltage signal for transition to the second driver 20. Furthermore, the controller CTR outputs a voltage of a waveform necessary for carrying out transition drive to also the counterelectrode CE of the countersubstrate CT. The transition drive will be described later in detail.

A start pulse signal and clock signal used to control an operation of a shift register of the first driver 10, Cs (storage capacitance line) polarity control signal configured to control the polarity of a superposition voltage obtained by capacitive coupling, and the like are included in the control signal output from the controller CTR to the first driver 10.

Next, pixel layout of the liquid crystal display will be described with reference to FIGS. 2 to 5.

FIG. 2 is a view showing an example of pixel layout of the liquid crystal display of this embodiment, and showing a part corresponding to the two pixels (pixel A and pixel B) surrounded by a broken line in the pixel arrangement of FIG. 1.

The pixel electrode PE is arranged in an area surrounded by signal lines S and storage capacitance lines Cs, and is arranged to overlap part of each of the signal line S and storage capacitance line Cs through the organic insulating film L3.

The pixel switch SW is provided with a T-shaped semiconductor layer PS extending to an underlayer of the storage capacitance line Cs to intersect the gate line G at the underlayer of the signal line S, and extending in a direction in which the storage capacitance line Cs extends at the underlayer of the storage capacitance line Cs. The semiconductor layer PS is electrically connected to the signal line S at a contact hole HL2 provided on one side of a part intersecting the gate line G. The semiconductor layer PS extends toward the storage capacitance line Cs side on the other side of the part intersecting the gate line G, and is electrically connected to the pixel electrode PE at a contact hole HL1 provided at a part at which the semiconductor layer PS and pixel electrode PE overlap each other. Although in this embodiment, the pixel switch SW is provided with a polysilicon layer as the semiconductor layer PS, the pixel switch SW may also be provided with an amorphous silicon layer.

The semiconductor layer PS extends from the underlayer of the signal line S toward the storage capacitance line Cs to which the storage capacitance Cst of a corresponding display pixel PX is connected. Accordingly, the semiconductor layer PS of the pixel switch SW configured to switch connection between the pixel electrode PE of pixel A and signal line S extends from the underlayer of the signal line S toward the upper side storage capacitance line Cs, and extends, at the underlayer of the upper side storage capacitance line Cs, in a direction in which the storage capacitance line Cs extends. The semiconductor layer PS of the pixel switch SW configured to switch connection between the pixel electrode PE of pixel B and signal line S extends from the underlayer of the signal line S toward the lower side storage capacitance line Cs, and extends, at the underlayer of the lower side storage capacitance line Cs, in a direction in which the storage capacitance line Cs extends.

The pixel electrode PE includes a concave part PEA provided at substantially a central part thereof in the longitudinal direction thereof (in which the signal line S extends). Concave parts PEA are provided at both ends of the pixel electrode PE in a direction in which the gate line G extends. Accordingly, the concave parts PEA of the pixel electrode PE arranged adjacent to each other in the direction in which the gate line G extends are arranged at positions opposed to each other.

Figure 3:
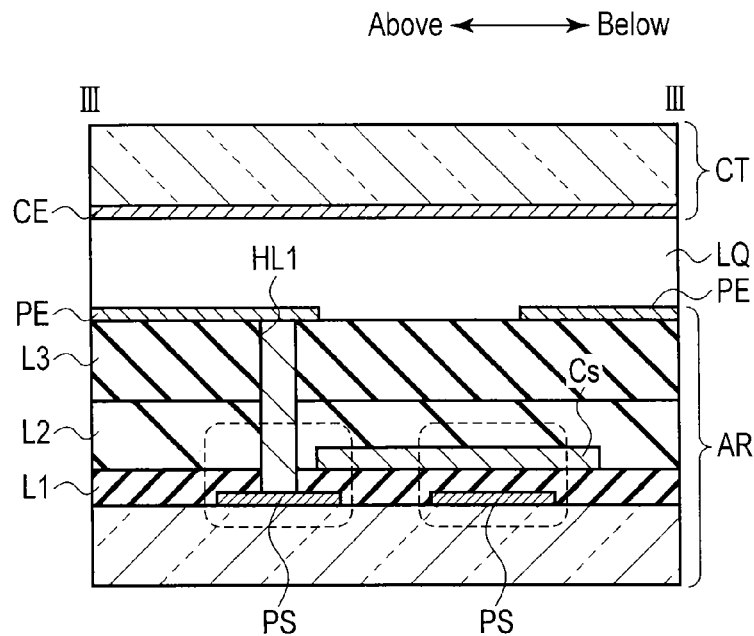
FIG. 3 is a view schematically showing an example of a cross section of a liquid crystal display panel taken along line III-III of FIG. 2.
Figure 4:
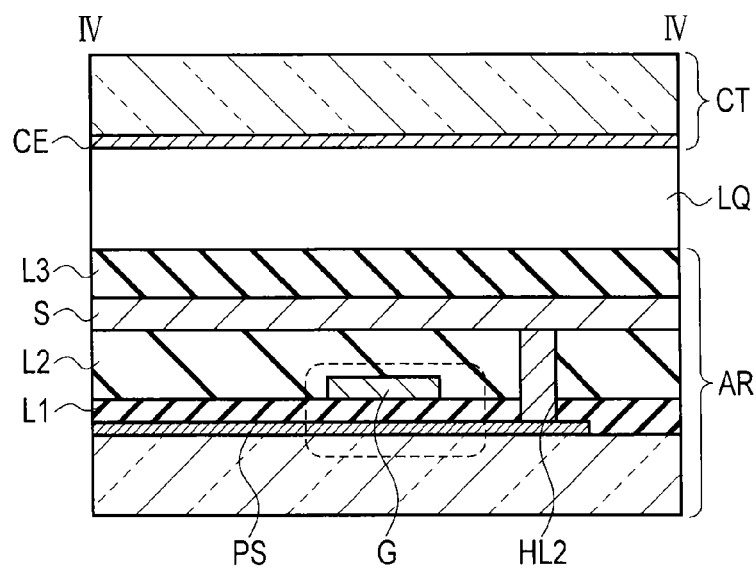
FIG. 4 is a view schematically showing an example of a cross section of the liquid crystal display panel taken along line IV-IV of FIG. 2.

The signal line S includes a convex part SA provided at a position at which the signal line S overlaps the concave part PEA of the pixel electrode PE through the interlayer insulating film L2 and the organic insulating film L3 (shown in FIGS. 3 to 5). In this embodiment, the convex part SA of the signal line S is arranged to overlap the whole concave part PEA of the pixel electrode PE.

The gate line G extends to intersect the signal line S at a substantially central part of the pixel electrode PE in the longitudinal direction thereof. The gate line G is arranged at a position at which the concave part PEA of the pixel electrode PE, and convex part SA of the signal line S overlap each other.

As shown in FIG. 2 and FIG. 3, the storage capacitance Cst is formed by interposing the insulating layer (gate insulating film) between the electrode (semiconductor layer electrode) of the semiconductor layer (for example, a polysilicon (p-Si) layer) PS and storage capacitance line Cs. The semiconductor layer electrode of the storage capacitance Cst is electrically connected to the pixel electrode PE at contact hole HL1, and becomes equal in potential to the pixel electrode PE.

Further, the semiconductor layer PS intersects the gate line at a part corresponding to the longitudinal bar of the T-shaped semiconductor layer PS with the gate insulating film interposed between them, and the pixel switch SW is formed at this part. The source side of the pixel switch SW is electrically connected to the signal line S at contact hole HL2, and the drain side thereof is formed integral with the semiconductor layer electrode of the storage capacitance Cst. It should be noted that the gate line G functions as the gate electrode of the pixel switch SW.

FIG. 3 is a view schematically showing an example of a cross-sectional structure of a liquid crystal display panel taken along line III-III shown in FIG. 2. FIG. 3 shows an example of a cross-sectional structure of a boundary part of two display pixels PX arranged side by side in a direction in which the signal line S extends.

A semiconductor layer PS (semiconductor electrode) is arranged on the transparent insulating substrate of the array substrate AR. In this cross section, the two semiconductor layers PS are arranged side by side in a direction substantially perpendicular to a direction in which the storage capacitance line Cs extends.

The storage capacitance line Cs is arranged in the upper layer of the semiconductor layer PS through a gate insulating film L1. The storage capacitance line Cs is arranged in such a manner that the storage capacitance line Cs overlaps part of one semiconductor layer PS and the whole part of the other semiconductor layer PS. In the storage capacitance line Cs, a concave part is formed at a part at which the storage capacitance line Cs overlaps the one semiconductor layer PS.

The pixel electrode PE is arranged in the upper layer of the storage capacitance line Cs through an interlayer insulating film L2, and organic insulating film L3. Two pixel electrodes PE are arranged side by side in a direction substantially perpendicular to a direction in which the storage capacitance line Cs extends.

At a part at which the one pixel electrode PE and the one semiconductor layer PS overlap each other, the concave part of the storage capacitance line Cs is arranged, and contact hole HL1 penetrating the gate insulating film L1, interlayer insulating film L2, and organic insulating film L3 is provided. At contact hole HL1, the one pixel electrode PE and the one semiconductor layer PS are electrically connected to each other.

On the pixel electrode PE, an alignment layer (not shown) is arranged. A surface of the alignment layer has been subjected to alignment layer treatment processing such as rubbing or optical alignment layer treatment processing in a predetermined direction.

The countersubstrate CT includes a color filter (not shown), and counterelectrode CE which are arranged on a transparent insulating substrate such as glass. The counterelectrode CE is arranged to be opposed to the plurality of pixel electrodes PE. On the counterelectrode CE, an alignment layer (not shown) is arranged, and a surface thereof has been subjected to alignment layer treatment processing such as rubbing or optical alignment layer treatment processing in a predetermined direction.

FIG. 4 is a view showing an example of a cross-sectional structure of the liquid crystal display panel taken along line IV-IV shown in FIG. 2. FIG. 4 shows an example of a cross-sectional structure taken along line IV-IV substantially parallel to the signal line S at a position at which the gate line G and the signal line S intersect each other.

In the array substrate AR, a semiconductor layer PS is arranged on a transparent insulating substrate. A gate line G is arranged above the semiconductor layer PS through a gate insulating film L1. A signal line S is arranged above the gate line through an interlayer insulating film L2. An organic insulating film L3 is arranged on the signal line S.

On an extension end part of the semiconductor layer PS, a contact hole HL2 is provided in the gate insulating film L1, and interlayer insulating film L2. At contact hole HL2, the signal line S and the semiconductor layer PS are electrically connected to each other.

The configuration of the countersubstrate CT is identical to the case shown in FIG. 3, and hence a description thereof is omitted here.

FIG. 5 is a view showing an example of a cross-sectional view of the liquid crystal display panel taken along line V-V shown in FIG. 2. FIG. 5 shows an example of a cross-sectional structure taken along line V-V substantially parallel to the gate line G at a position at which the gate line G and the signal line S intersect each other.

On the transparent insulating substrate of the array substrate AR, a semiconductor layer PS is arranged and, a gate line G is arranged above the semiconductor layer PS through a gate insulating film L1. A signal line S is arranged above the gate line G through an interlayer insulating film L2. A pixel electrode PE is arranged above the signal line S through an organic insulating film L3.

The signal line S includes a convex part SA protruding along line V-V. Part of the pixel electrode PE arranged at the convex part SA is removed to thereby form a concave part PEA. The convex part SA is arranged to overlap part of the pixel electrode PE. The part at which the convex part SA and the concave part PEA overlap each other serves as a transition nucleus forming part during the period of transition drive.

On the pixel electrode PE, an alignment layer (not shown) is arranged. The surface of the alignment layer has been subjected to alignment layer treatment processing such as rubbing or optical alignment layer treatment processing in a predetermined direction.

The configuration of the countersubstrate is identical to the case shown in FIG. 3, and hence a description thereof is omitted here.

As described above, a transition nucleus forming part is incorporated in the pixel electrode PE at the side thereof parallel to the signal line S. During the period of transition drive, a predetermined voltage is applied to this part of a peculiar shape to generate a longitudinal voltage shown by arrows in FIG. 5 or a lateral voltage, whereby it is possible to quickly make a transition from a splay state of the liquid crystal to a bend state.

Here, a description will be given of a suitable position for forming a transition nucleus forming part.

As the first condition, it is desirable that the transition nucleus forming part be positioned at an outer circumferential part of the pixel electrode PE. This is because if the transition nucleus forming part is formed inside the pixel electrode PE, an area contributing to display is reduced by the transition nucleus forming part, and the inconvenience of lowering or the like of the luminance resulting from a reduction in aperture ratio is caused.

As the second condition, regarding the position of the transition nucleus forming part, it is necessary to take propagation of a transition to the bend alignment into consideration. A transition from the splay alignment to the bend alignment, and occurring by using the vicinity of the transition nucleus forming part as a nucleus as described above is propagated in a substantially concentric form at a constant speed on the pixel electrode PE and, finally, the whole display pixel PX is brought into the bend state (within about one to two seconds in this embodiment). Accordingly, in order to complete the transition within a shortest possible time, it is desirable that the transition nucleus forming part be arranged in such a manner that a distance on the pixel electrode PE from the transition nucleus forming part to a position at which the distance is maximized becomes as short as possible. In other words, when a circle of a minimum radius including one pixel electrode PE is drawn around the transition nucleus forming part, it is desirable that the radius of the circle be as small as possible.

In the case of this embodiment, the pixel electrode PE has a substantially rectangular shape including long sides substantially parallel to the signal line S. Accordingly, when the transition nucleus forming part is arranged in the vicinity of a substantially central position of the side of the pixel electrode PE parallel to the signal line S as shown in FIG. 2, it can be said that the above position best conforms to the first condition and second condition, and is the most appropriate position.

It should be noted that when the transition nucleus forming part is arranged in the manner described above, although the transition nucleus forming part and the pixel switch SW overlap each other in FIG. 2, as can be seen from FIG. 5, parts overlapping the transition nucleus forming part are the gate line G of the pixel switch SW, and semiconductor layer PS in the lower layer of the gate line G and, the transition nucleus forming part is constituted of the signal line S and pixel electrode PE in the upper layer of the signal line S, and hence the transition nucleus forming part is totally separated from the gate line G and semiconductor layer PS, thereby posing no problem.

Rather than the above, it is possible to increase the aperture ratio by making the transition nucleus forming part and pixel switch SW which do not contribute to display overlap each other, and hence the above-mentioned configuration is desirable.

Next, details of the transition drive in the liquid crystal display of this embodiment will be described below.

FIG. 6 is a view showing an example of transition drive waveforms of the liquid crystal display of this embodiment. The transition drive waveforms of FIG. 6 show an example of drive waveforms in a transition period, transition negative period, and transition positive period. Among these periods, those particularly greatly contribute to a transition from the splay alignment to the bend alignment are the transition negative period and transition positive period.

The waveform "Source" shows a waveform obtained when the controller CTR controls the second driver 20 to thereby apply a voltage collectively to all the signal lines S, and the waveform "VCOM" shows a waveform of a voltage to be applied to the counterelectrode CE.

Further, the controller CTR transmits a gate-all-on control signal to the first driver 10, switches the gate-all-on control signal, and carries out drive such as all-on or normal scanning for the gate line G as shown on the "Source" waveform. Here, the term "all-on" implies bringing the gate lines G of all the rows into a selective state, and bringing all the pixel switches connected to all the gate lines G into a conduction state. Further, the term "normal scanning" implies bringing only one or several gate lines G of all the gate lines G into a selective state, and sequentially shifting the selection range from above to below or from below to above (in general, a process of scanning once from above to below or from below to above is repetitively carried out a plurality of times). In other words, during the period of "all-on", all the gate lines G are selected and driven. During the period of "normal scanning", one or several gate lines G are sequentially selected and driven.

It should be noted that the two processes of the transition negative period and transition positive period are carried out in order to prevent the liquid crystal layer from being charged up by alternating the polarity of the longitudinal voltage generated between the pixel electrode PE and counterelectrode CE.

Further, the transition periods are provided immediately before the transition negative period, between the transition negative period and transition positive period, and immediately after the transition positive period. Although during the transition period, the gate lines G are subjected to all-on, the gate lines G may be rendered on in sequence in the transition period, then they may be subjected to all-on for a predetermined period, and then may be rendered off in sequence. In either case, it is possible to prevent the pixel potential from being unexpectedly varied by coupling through the liquid crystal capacitance between the counterelectrode CE and pixel electrode PE, and prevent the pixel switch SW from being subjected to stress by subjecting the gate lines G to all-on at timing at which the VCOM potential changes, and fixing the pixel potential at the signal line potential.

FIG. 7 is a view showing an example of gate line drive waveforms and storage capacitance line Cs drive waveforms (corresponding to A1 or A2 of FIG. 6) in the transition negative period and transition positive period of FIG. 6.

In the liquid crystal display of this embodiment, in the transition negative period, and transition positive period, potentials of the storage capacitance lines Cs are sequentially scanned in time to scanning of the gate lines G. That is, when attention is paid to a unit period indicated by one frame in FIG. 7, the gate lines are scanned in sequence in order of G (1), G (2), ..., G (M), and each of the storage capacitance lines Cs changes in potential after selection of upper and lower gate lines G thereof is completed. For example, when attention is paid to the storage capacitance line Cs (2), the potential thereof changes after selection of the upper gate line G (1) thereof, and the lower gate line G (2) thereof is completed.

Here, it is assumed that the potential of the storage capacitance line Cs takes one of two values VCsH (high potential), and VCsL (low potential) and, regarding the potential change, a change from VCsH to VCsL, and a change from VCsL to VCsH are alternately repeated for each frame.

Further, in the same frame, the potential change of the storage capacitance line Cs is reversed in direction for each row. For example, when a storage capacitance line Cs of an odd-numbered row makes a change in potential from VCsH to VCsL, a storage capacitance line Cs of an even-numbered row makes a change in potential from VCsL to VCsH.

Figure 8:
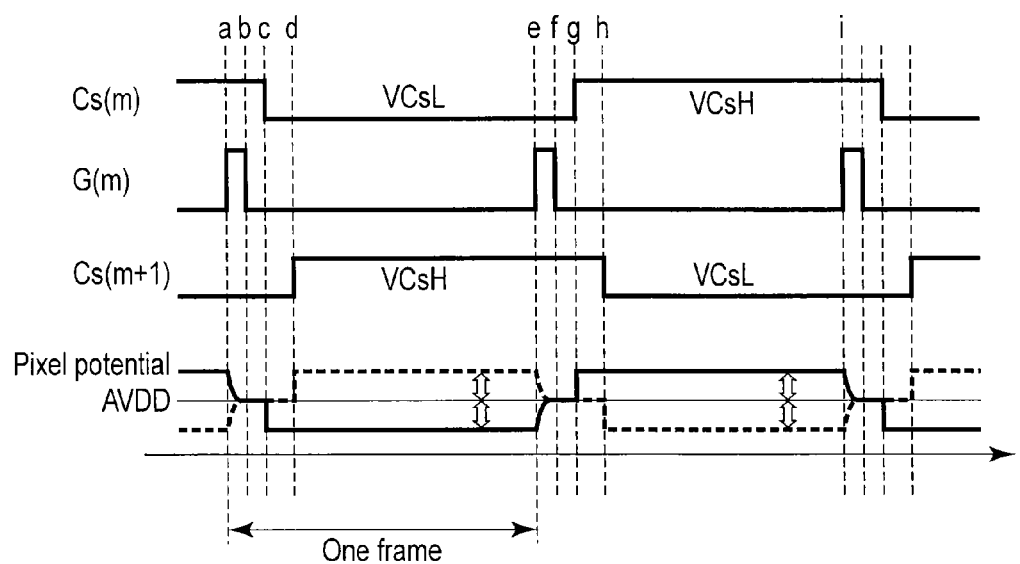
FIG. 8 is a view for explaining an example of a change in pixel potential in the transition negative period shown in FIG. 6.
Figure 8:
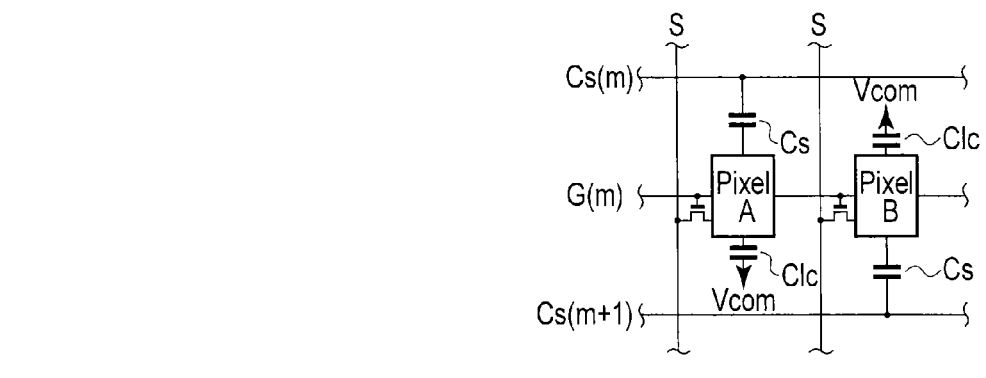

FIG. 8 is a view for explaining an example of a change in pixel potential in the transition negative period. FIG. 8 shows an example of changes in potential of pixel A and pixel B selected by the gate line G (m) in addition to the drive waveforms of the gate line G (m) (1≤m≤M) of FIG. 7, and storage capacitance lines Cs (m), and Cs (m+1) which are positioned above and below the gate line G (m).

First, the gate line G (m) is selected during a period from timing a to timing b of the one frame period, the pixel switch SW is made conductive, and the potential (pixel potential) of the pixel electrode PE of each of pixel A and pixel B becomes AVDD [V].

Further, also during a period from timing b to timing c after the selection of the gate line G (m), the potential AVDD [V] of the pixel electrode PE is retained. It should be noted that strictly speaking, although when the selection of the gate line G (m) is completed, the pixel potential is slightly shifted by the influence of coupling based on the gate-drain capacitance of the pixel switch SW, the shift is minute, and is hence neglected here.

Further, at timing c, the potential of the storage capacitance line Cs (m) changes from VCsH to VCsL, whereby the potential of pixel A having capacitance Cs between itself and the storage capacitance line Cs (m) is changed by capacitive coupling.

At this time, assuming that the storage capacitance is Cs, and the liquid crystal capacitance is Clc, and other items such as parasitic capacitance are neglected, a change in potential of pixel A is substantially given by $-Cs/(Cs+Clc) \times (VCsH-VCsL)$ (to be set as $=-\Delta Vcc$). That is, the pixel potential of pixel A becomes $AVDD-\Delta Vcc$.

Next, at timing d, the potential of the storage capacitance line Cs (m+1) changes from VCsL to VCsH, whereby the potential of pixel B having storage capacitance Cst between itself and the storage capacitance line Cs (m+1) is changed by capacitive coupling.

At this time, assuming that the storage capacitance is Cs, and the liquid crystal capacitance is Clc, and other items such as parasitic capacitance are neglected, a change in potential of pixel B is substantially given by $Cs/(Cs+Clc) \times (VCsH-VCsL)$ (to be set as $=\Delta Vcc$). That is, the pixel potential of pixel B becomes $AVDD+\Delta Vcc$.

Thereafter, during a period from timing d to timing e at which the gate line G (m) is selected in the next frame, the above-mentioned pixel potentials are retained in pixel A and pixel B.

Operations to be carried out during a period from timing e to timing i in the next frame are totally identical to those in period from timing a to timing e except that the sign of the change in potential caused by capacitive coupling is reversed.

Figure 9:
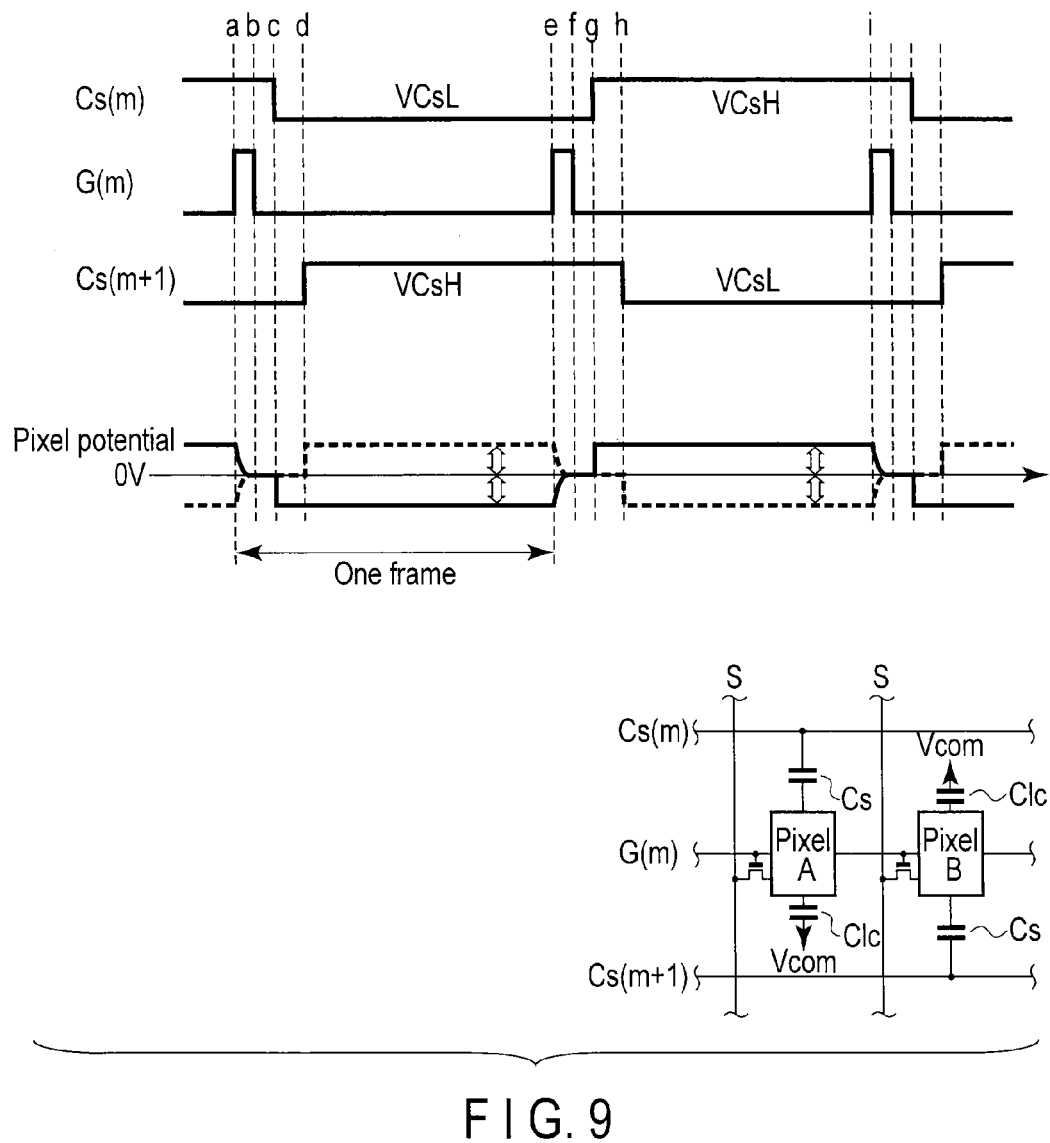
FIG. 9 is a view for explaining an example of a change in pixel potential in the transition positive period shown in FIG. 6.

FIG. 9 is a view for explaining an example of a change in pixel potential in the transition positive period. FIG. 9 shows an example of changes in potential of pixel A and pixel B selected by the gate line G (m) in addition to the drive waveforms of the gate line G (m) (1≤m≤M) of FIG. 7, and storage capacitance lines Cs (m), and Cs (m+1) which are positioned above and below the gate line G (m). Although the potential waveforms of the gate line G (m), and storage capacitance lines Cs (m) and Cs (m+1) are identical to FIG. 8, FIG. 9 differs from FIG. 8 in that the signal line potential is zero V.

First, the gate line G (m) is selected during a period from timing a to timing b of the one frame period, the pixel switch SW is made conductive, and the potential (pixel potential) of the pixel electrode PE of each of pixel A and pixel B becomes zero V.

Further, also during period from timing b to timing c after the selection of the gate line G (m), the zero V is retained as a pixel potential.

Further, at timing c, the potential of the storage capacitance line Cs (m) changes from VCsH to VCsL, whereby the potential of pixel A having capacitance Cs between itself and the storage capacitance line Cs (m) is changed by capacitive coupling.

At this time, assuming that the storage capacitance is Cs, and the liquid crystal capacitance is Clc, and other items such as parasitic capacitance are neglected, a change in potential of pixel A is substantially given by $-Cs/(Cs+Clc) \times (VCsH-VCsL)$ (to be set as $=-\Delta Vcc$). That is, the pixel potential of pixel A becomes $0-\Delta Vcc$.

Next, at timing d, the potential of the storage capacitance line Cs (m+1) changes from VCsL to VCHL, whereby the potential of pixel B having storage capacitance Cst between itself and the storage capacitance line Cs (m+1) is changed by capacitive coupling.

At this time, assuming that the storage capacitance is Cs, and the liquid crystal capacitance is Clc, and other items such as parasitic capacitance are neglected, a change in potential of pixel B is substantially given by Cs/(Cs+Clc)×(VCsH−VCsL) (to be set as=ΔVcc). That is, the pixel potential of pixel B becomes 0+ΔVcc.

Thereafter, during a period from timing d to timing e at which the gate G (m) is selected in the next frame, the above-mentioned pixel potentials are retained in pixel A and pixel B.

Operations to be carried out in period from timing e to timing i in the next frame are totally identical to those in period from timing a to timing e except that the sign of the change in potential caused by capacitive coupling is reversed.

FIG. 10 is a table showing an example of a signal line potential, potential to be written to a pixel, pixel retention potential after superposition of storage capacitance, counter-electrode potential, absolute value of a longitudinal voltage, and absolute value of a lateral voltage.

In this driving method, it is a remarkable characteristic that a potential difference of ±ΔVcc is generated between the signal line S and pixel potential in the retention period. This potential difference (±ΔVcc) corresponds to the lateral voltage of the transition nucleus forming part shown in FIG. 5.

As described above, according to this embodiment, a lateral voltage is applied in addition to the longitudinal voltage during transition drive, whereby it is possible to provide a liquid crystal display, and driving method thereof by each of which a transition from the splay alignment to the bend alignment is promoted, and transition drive is efficiently carried out within a short time and by using a low voltage.

As a typical example, assuming that Cs/Clc is 4, VCsH is 5 V, and VCsL is 0 V, the magnitude of the lateral voltage is obtained as ΔVcc=4/(4+1)×(5−0)=4 V. It should be noted that it is generally desirable that ΔVcc be within a range of about 0.5 to 10 V.

Here, the driving method of the liquid crystal display of this embodiment, and a driving method of a liquid crystal display of a comparative example will be compared with each other. In the liquid crystal display of the comparative example, in each of the transition negative period, and transition positive period, transition drive of applying the identical voltage to all the storage capacitance lines Cs is carried out, and other items are identical to the liquid crystal display of this embodiment.

In the liquid crystal display of the comparative example, the controller CTR controls the first driver 10 to apply VCsL to all the storage capacitance lines Cs in the transition negative period, and apply VCsH to all the storage capacitance line Cs in the transition positive period. The liquid crystal display of the comparative example is identical to the liquid crystal display of this embodiment except for the above point.

In the transition negative period, the signal line potential is set to the maximum value (AVDD [V]) of the range of the voltage which the second driver 20 can output, and a negative voltage (Vcom (n) [V]) is applied to the counterelectrode. At this time, when the gate lines G are subjected to normal scanning, in a row a gate line G of which is selected, a pixel switch SW is made conductive, a signal line potential (AVDD [V]) is written to a pixel electrode PE, and this potential is retained substantially as it is even after selection is completed. It should be noted that at this time, strictly speaking, although when the selection of the gate line G is completed, the pixel potential is slightly shifted by the influence of coupling based on the gate-drain capacitance of the pixel switch SW, the shift is minute, and is hence neglected here.

Accordingly, a voltage corresponding to a difference between AVDD [V] and Vcom (n) [V] is applied between the pixel electrode PE and counterelectrode CE, and this voltage serves as the longitudinal voltage indicated by arrows in FIG. 5, whereby a transition from the splay alignment to the bend alignment is made.

Here, it is assumed that the value of the negative voltage to be applied to the counterelectrode is determined in advance. Further, the signal line potential is set to the maximum value, whereby it is possible to maximize the absolute value of the longitudinal voltage, shorten the time necessary for the transition nucleus forming part to form a nucleus of a transition from the splay alignment to the bend alignment, and time necessary for the bend transition area to propagate within the pixel electrode, and make a transition within a short time and by using a low voltage.

In the transition positive period, the signal line potential is set to the minimum value (0 [V]) of the range of the voltage which the second driver 20 can output, and a positive voltage (Vcom (p) [V]) is applied to the counterelectrode. When the gates are subjected to normal scanning, in a row a gate of which is selected, a pixel switch SW is made conductive, a signal line potential (0 [V]) is written to a pixel electrode PE, and this potential is retained substantially as it is even after selection is completed.

Accordingly, a voltage corresponding to a difference between 0 [V] and Vcom (p) [V] is applied between the pixel electrode PE and counterelectrode CE, and this voltage serves as the longitudinal voltage indicated by arrows in FIG. 5, whereby a transition from the splay alignment to the bend alignment is made.

Here, it is assumed that the value of the positive voltage to be applied to the counterelectrode is determined in advance. Further, the signal line potential is set to the minimum value, whereby it is possible to maximize the absolute value of the longitudinal voltage, shorten the time necessary for the transition nucleus forming part to form a nucleus of a transition from the splay alignment to the bend alignment, and time necessary for the bend transition area to propagate within the pixel electrode, and make a transition within a short time and by using a low voltage.

In the driving method of the liquid crystal display of this embodiment, the absolute values of the longitudinal voltages in the transition negative period, and transition positive period are respectively given by (AVDD±ΔVcc)−Vcom (n), and Vcom (p)−(0±ΔVcc) as shown in FIG. 10. However, when they are averaged with respect to ±ΔVcc, they can be regarded as being AVDD−Vcom (n), and Vcom (p), respectively. The absolute value of each of the lateral voltages in both the transition negative period, and transition positive period is ΔVcc.

On the other hand, in the transition drive of the liquid crystal display of the comparative example, the absolute values of the longitudinal voltages in the transition negative period, and transition positive period can be regarded as being AVDD−Vcom (n), and Vcom (p), respectively. Further, the pixel potential and signal line potential in the retention period are substantially equal to each other, and hence the absolute value of the lateral voltage can be regarded as zero V.

On the basis of the above description, when the driving methods of this embodiment and comparative example are compared with each other on the condition that the output voltage range of the second driver 20, and the potentials of the counterelectrode CE on the positive side and the negative side are constant, the time-averaged absolute values of the longitudinal voltages in both the methods are identical to each other, whereas the absolute value of the lateral voltage in the driving method of this embodiment is greater than the comparative example.

Accordingly, the driving method of this embodiment makes it possible to make a transition from the splay alignment to the bend alignment more quickly and more securely, and shorten the transition time or reduce the transition voltage.

It should be noted that in the description of the liquid crystal display of this embodiment, although it has been described that the maximum value and minimum value of the range of the voltage which the second driver 20 can output are respectively applied in the transition negative period, and transition positive period, the value of the voltage to be applied need not necessarily be strictly limited to the maximum or the minimum value, and it is sufficient if the value of the voltage is within a predetermined voltage range including the maximum value or within a predetermined voltage range including the minimum value.

It should be noted that in the changes in voltage of the storage capacitance line Cs, although the sign of the voltage is reversed for each frame and for each row, the sign of the voltage need not necessarily be reversed as described above and, for example, the sign may be reversed every two frames, and every two rows. Even in that case, the same advantage as the above-mentioned embodiment can be obtained.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A liquid crystal display comprising:
a plurality of pixel electrodes arranged in a matrix;
a plurality of gate lines extending along rows in which the pixel electrodes are arranged;
a plurality of signal lines extending along columns in which the pixel electrodes are arranged;
a plurality of storage capacitance lines extending along the rows in which the pixel electrodes are arranged, and configured to superpose a voltage on the pixel electrodes by capacitive coupling;
a plurality of pixel switches configured to switch connection between the signal lines and the corresponding pixel electrodes by a voltage to be applied to the gate lines;
a counter-electrode opposed to the plurality of pixel electrodes through a liquid crystal layer;
a driver configured to drive the gate lines, the signal lines, and the storage capacitance lines; and
a controller configured to control the driver,
wherein
in a transition drive period configured to cause alignment of the liquid crystal layer before a normal display period to make a transition from splay alignment to bend alignment, the controller sequentially drives the gate lines to write from the signal lines to the pixel electrodes and, after the write from the signal lines to the pixel electrodes, changes a potential of each of the storage capacitance lines to superpose a voltage based on capacitive coupling on each of the pixel electrodes,
in the transition drive period, the period during which the gate lines are sequentially driven includes a transition negative period during which a negative voltage is applied to the counter-electrode, and the maximum voltage of a source output voltage range is applied to the signal lines, and a transition positive period during which a positive voltage is applied to the counter-electrode, and the minimum voltage of the source output voltage range is applied to the signal lines, and
a liquid crystal mode is optically compensated bend (OCB).

2. The liquid crystal display according to claim 1, wherein in the transition drive period, the controller provides, before and after a period during which the gate lines are sequentially driven, transition drive periods in each of which all the gate lines are selected and driven, and switches a voltage to be applied to the counter-electrode in each of the transition drive periods.

3. The liquid crystal display according to claim 2, wherein each of the pixel electrodes comprises a concave part provided at a central part of a side of an outer circumference thereof, the side being substantially parallel to the signal line, and
the signal line comprises a convex part overlapping the concave part.

4. The liquid crystal display according to claim 1, wherein each of the pixel electrodes comprises a concave part provided at a central part of a side of an outer circumference thereof, the side being substantially parallel to the signal line, and
the signal line comprises a convex part overlapping the concave part.

5. A driving method of a liquid crystal display including:
a plurality of pixel electrodes arranged in a matrix;
a plurality of gate lines extending along rows of the pixel electrodes;
a plurality of signal lines extending along columns of the pixel electrodes;
a plurality of storage capacitance lines extending along the rows of the pixel electrodes, and configured to superpose a voltage on the pixel electrodes by capacitive coupling;
a plurality of pixel switches configured to switch connection between the signal lines and the corresponding pixel electrodes by a voltage to be applied to the gate lines;
a counter-electrode opposed to the plurality of pixel switches through a liquid crystal layer;
a driver configured to drive the gate lines, the signal lines, and the storage capacitance lines; and
a controller configured to control the driver, the controller:
controlling the driver, in a transition drive period configured to cause alignment of the liquid crystal layer before a normal display period to make a transition from splay alignment to bend alignment, to select and drive all the gate lines, and switch a voltage to be applied to the counter-electrode;
sequentially driving the gate lines to write from the signal lines to the pixel electrodes, and changing, after the write from the signal lines to the pixel electrodes, a potential of each of the storage capacitance lines to superpose a voltage based on capacitive coupling on each of the pixel electrodes; and
in the transition drive period, the period during which the gate lines are sequentially driven includes a transition negative period during which a negative voltage is applied to the counter-electrode, and the maximum voltage of a source output voltage range is applied to the signal lines, and a transition positive period during which a positive voltage is applied to the counter-electrode, and the minimum voltage of the source output voltage range is applied to the signal lines, and wherein a liquid crystal mode is optically compensated bend (OCB).

* * * * *